United States Patent [19]

Gustafsson

[11] 4,037,742
[45] July 26, 1977

[54] PROGRAMME CONTROLLED HYDRAULIC LOADING CRANE

[75] Inventor: Hans Eric Karl Gustafsson, Saltsjoduvnas, Sweden

[73] Assignee: Hiab-Foco Aktiebolag, Hudiksvall, Sweden

[21] Appl. No.: 620,267

[22] Filed: Oct. 7, 1975

[30] Foreign Application Priority Data

Oct. 8, 1974 Sweden .............................. 7412624

[51] Int. Cl.² .............................................. E02F 3/32
[52] U.S. Cl. .......................... 214/138 R; 212/39 MS; 214/762; 340/267 C
[58] Field of Search ............................... 214/762-764, 214/DIG. 2, 1 CM, 141, 138 R, 11 C, 761; 235/151.11 R, 151.11 M; 212/39 R, 39 A, 39 MS, 39 P; 340/267 C; 104/38; 37/DIG. 1

[56] References Cited

U.S. PATENT DOCUMENTS

| | | | |
|---|---|---|---|
| 2,772,411 | 11/1956 | Cooper | 212/39 R |
| 2,858,070 | 10/1958 | Scharff | 212/39 MS X |
| 3,390,794 | 7/1968 | McMullen | 214/141 X |
| 3,489,294 | 1/1970 | Greb | 212/39 R |
| 3,543,910 | 12/1970 | Devol | 235/151.11 M |
| 3,661,051 | 5/1972 | Dunne | 235/151.11 M |
| 3,826,383 | 7/1974 | Richter | 214/1 CM |
| 3,943,343 | 3/1976 | Irie | 214/1 CM |

*Primary Examiner*—Albert J. Makay
*Assistant Examiner*—Ross Weaver
*Attorney, Agent, or Firm*—Newton, Hopkins & Ormsby

[57] ABSTRACT

In a hydraulically operated loading crane of the kind comprising a rotatable crane post, an inner crane boom pivotally mounted at the upper end of said post, a jib pivotally mounted to said boom, and an extension boom mounted for longitudinal displacement relative to said jib and supporting at its outer end a load hoisting tool, an electronically programmable control system incorporating encoders capable of measuring the relative movements of the crane parts and arranged to store the measured values in a memory, and a comparator means arranged to compare signals representing pre-programmed patterns of movements with the signals received from said encoders so as to effect feeding of the required quantity of pressurized medium to the various hydraulic means to obtain the desired, pre-programmed patterns of movements.

4 Claims, 11 Drawing Figures

PROGRAMME CONTROLLED HYDRAULIC LOADING CRANE

BACKGROUND OF THE INVENTION

Hydraulic loading cranes are already known comprising a hydraulically rotatable vertical post to which is pivotally mounted an inner hoisting boom arranged for movement in the vertical plane, such movement effected by hydraulic means, and at the outer end of which boom an outer boom, a so-called jib is mounted so as to be hydraulically pivotable in a vertical plane. The jib is generally equipped with an extension boom which is displaceable in the longitudinal direction of the jib by hydraulic means and the outer end of which supports the load to be lifted.

It is also previously known to equip a hydraulically operated loading crane of this type with a valve system making it possible to perform all the movements of the crane through manual operation of the spools of the valve.

It is furthermore known to arrange the crane valve system in such a way as to make it responsive to electrical signals emitted from a control box to the so-called directional valve, the latter being equipped for this purpose with an electro-hydraulic converter, i.e. a so-called electro-hydraulic servo valve. This arrangement provides considerable advantages as it makes possible to give the control box convenient dimensions and configuration while at the same time it gives a freer choice of operating positions since the control signals may be transferred via a flexible and, if required, long electric operating cable.

SUMMARY OF THE INVENTION

In accordance with the present invention the crane is provided with a control system which may be programmed electronically and which comprises on the one hand electrical encoders which are arranged, upon movement of the crane parts from a starting position to an end position and back, to register and store in a memory the change of position between the crane parts which are movable relative to one another, i.e. the crane post relative to the crane base, the inner crane boom relative to the post and the jib relative to the inner crane boom as well as the linear movement of the extension boom, if any, relative to the jib, an so on, and on the other hand a comparating unit inserted between the memory and a servo valve and arranged upon reading (play-back) of the memory during the crane operation compare signals stored in the memory with signals which are continuously emitted by the encoders to open the electro-hydraulic servo valve to valves corresponding to the difference between the continuously incoming signals and the signals emitted from the memory for the purpose of supplying a corresponding quantity of pressurized medium to the various hydraulic cylinders required, for the purpose of obtaining the pre-programmed movements of the above crane parts.

By running the crane through a pattern of movements by manually operating levers or buttons which influence the servo valve electrically, the encoders positioned in the crane measure the exact movements of the crane parts and these movements are then transferred to the memory of the control system. The memory is preferably in the form of a tape recorder. The programme memory is then able to repeat the signals which are characteristic of the pattern of movements and these signals are compared with the signals indicating the temporary positions of the encoders. In this way it becomes possible, as will be described more in detail in the following, to make the crane repeat the desired number of times the pattern of movements, once programmed.

Considerable advantages are obtained through the invention. The operation and work of the crane becomes independent of an operator, once the pattern of movements has been run through. All patterns of movements thereafter become identical. The speed of the movements may be kept low during the programming operation proper and thereafter be increased electronically by increasing the speed of play-back of the recorder. The crane may be used in environments which are unsuitable for human beings.

Potentiometers are preferably used as the electrical encoders. They are suitably positioned at the articulation points between the crane parts in question.

BRIEF DESCRIPTION OF THE DRAWINGS

The invention will be described more in detail in the following with reference to the accompanying drawings, wherein.

DETAILED DESCRIPTION OF A PREFERRED EMBODIMENT

Figure 1:
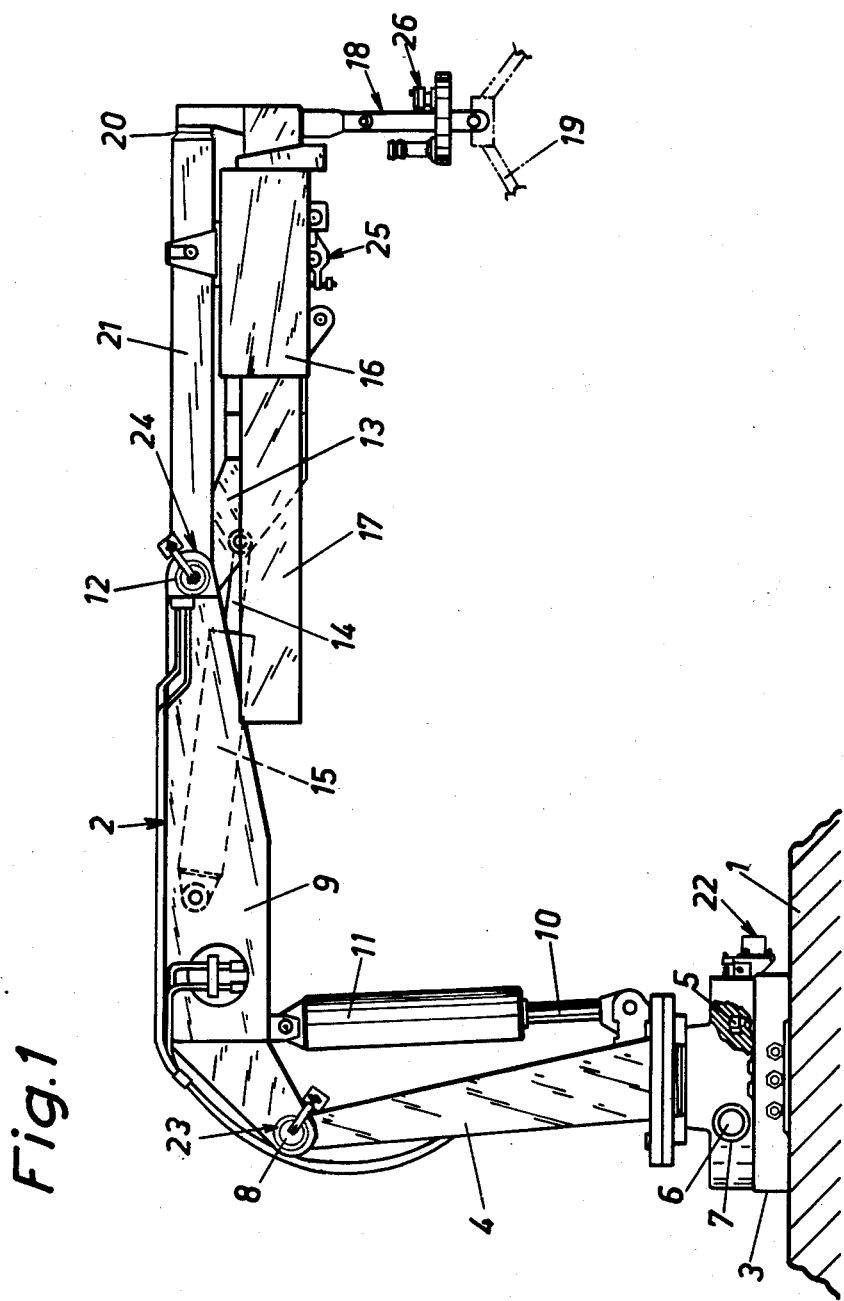
FIG. 1 is a side view of a loading crane in accordance with the invention.

FIG. 1 illustrates a loading crane 2 mounted on a loading vehicle 1. To the crane base 3 which is attached to the vehicle 1 is rotatably mounted a crane post 4 the lower end of which is provided with a gear wheel (not shown) cooperating with a pair of racks 5 each one of which is arranged to be axially displaced by its associated hydraulic piston-and-cylinder unit 6, 7. At the upper end of the crane post 4 is pivotally mounted one of an inner crane boom 9 so as to pivot about a horizontal shaft 8, the swinging movement of said boom in a vertical plane being effected by a hydraulic piston-and-cylinder unit 10, 11. To the outer end of the boom 9 is pivotally connected a jib 13 for pivotal movement about a horizontal shaft 12, a hydraulic piston-and-cylinder unit 14, 15 effecting the jib swinging movement in a vertical plane. The jib is provided at its one side and in a position in parallel with the longitudinal extension of the jib, with a means 16 serving to guide a boom 17, the so-called extension boom, at the outer end of which is mounted a rotator 18 supporting a gripper 19. The extension boom 17 is arranged for displacement in its longitudinal direction by means of a hydraulic piston-and-cylinder unit 20, 21.

The positions of the electric encoders 22, 23, 24, 25 and 26 to be described more in detail in the following, are indicated in FIG. 1.

MEANS TO DETERMINE THE ROTATIONAL MOVEMENT OF THE CRANE POST

Figure 5:
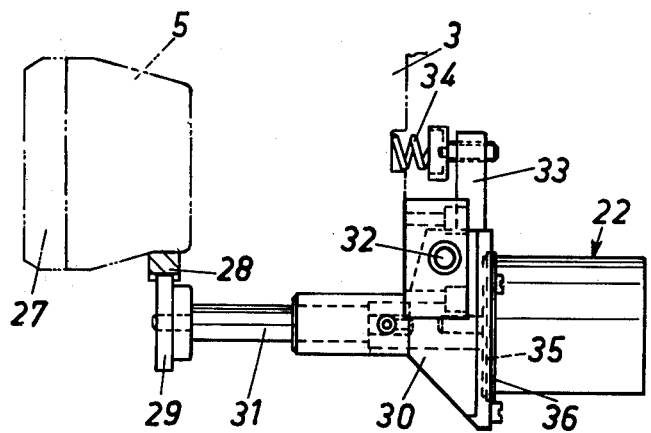
FIG. 5 is a side view of a means to emit signals in response to the torsional angle of the crane post.

In FIG. 5 numeral reference 5 designates the rack arranged to rotate the crane post 4. This rack the teeth 27 of which engage between the teeth of the cog wheel (not shown) disposed at the lower end of the crane post 4, is provided with a longitudinally extending rack 28 the teeth of which engage between the teeth of a smaller cog wheel 29 which is attached to one end of a shaft 31 which is rotatably mounted in a housing 30. The housing 30 is pivotally mounted on a transverse shaft 32 which is attached in the crane base 3, and has an upwardly extending arm 33 between which arm and the crane base 3 is held a steel spring 34. Owing to the steel spring 34 the cover 30 together with the shaft 31 are kept tilted in such a manner that the cog wheel 29 is constantly in perfect engagement with the rack 28. The potentiometer 22 is by its inner portion secured to the shaft 31 whereas its outer portion 35 by means of a friction attachment 36 is secured inside the housing 30.

Figure 3:
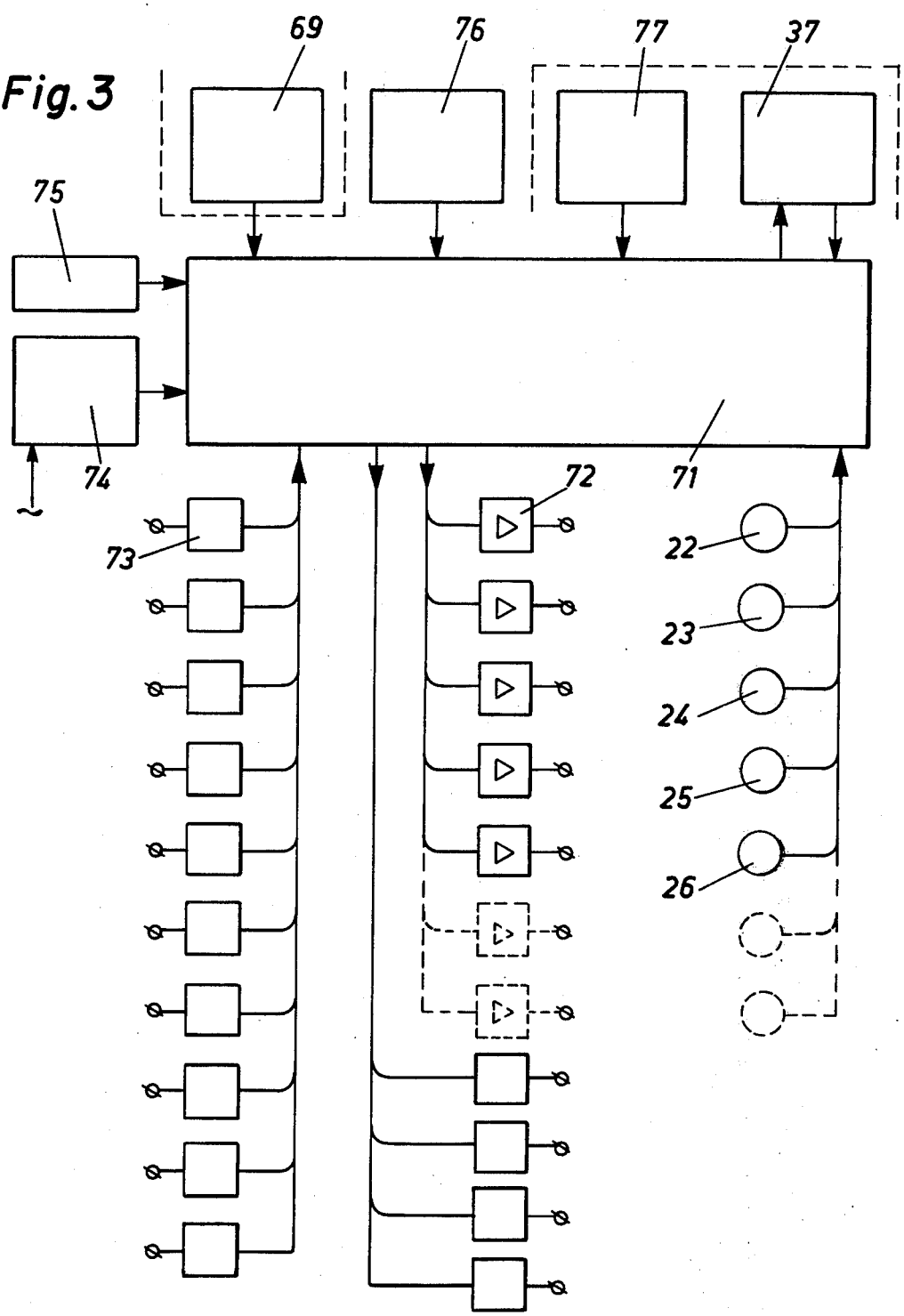
FIG. 3 shows a block diagram of a control system for the entire crane.

Upon displacement of the rack 5 in the longitudinal direction thereof the crane post 4 is turned and at the same time the inner portion of the potentiometer 22 is turned by means of the rack 28 via the cog wheel 29 and the shaft 31 relative to its outer portion 35 over a number of turns and/or a part of a turn which corresponds to the torsional angle of the crane post. The signal thus generated is transmitted to and stored in the memory 37 of the control system (FIG. 3).

MEANS TO DETERMINE THE PIVOTAL ANGLE OF THE INNER CRANE BOOM RELATIVE TO THE CRANE POST

Figure 7:
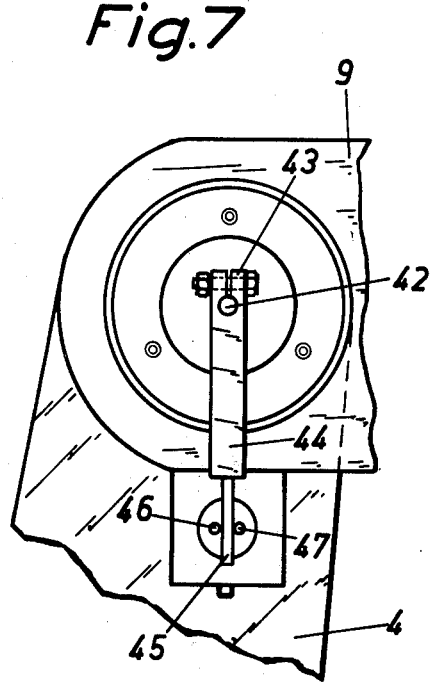
FIG. 7 is an end view (as seen from the right) of this means.
Figure 6:
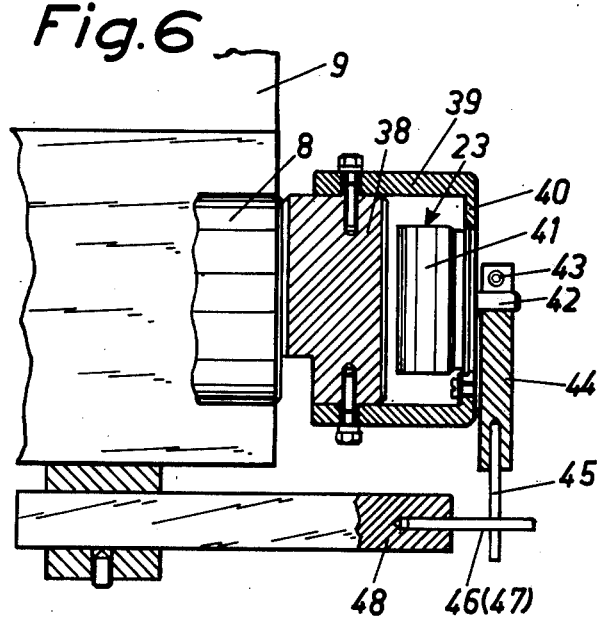
FIG. 6 is a side view which partly in a vertical section illustrates a means for emittance of signals in response to the pivotal angle between the crane post and the inner crane boom.

The horizontal shaft 8 (FIGS. 6 and 7) is imagined to be stationarily mounted at the upper end of the crane post 4, and the inner crane boom 9 (FIG. 1) is pivotally mounted on the shaft 8. To one end 38 of the shaft 8 is attached a cover 39 and the potentiometer 23 is secured to the inner face of the end wall 40 of this cover by means of a friction attachment 41. The inner portion of the potentiometer 23 is formed with a shaft 42 at the outer end of which is provided an arm 44 the upper end of which is secured to said shaft by means by a clamping means 43. The lower arm end which is shaped as a pin 45 or similar means engages between the two leg sections 46, 47 of a fork 48 which is secured to the crane boom 9.

Upon pivotal movement of the crane boom 9 relative to the crane post 4 the arm 44 is turned together with the fork 48 and thus also the inner portion of the potentiometer relative to the outer portion 41 thereof. As a result a signal is emitted from the potentiometer in dependence on the portion of one turn over which the inner portion of the potentiometer is turned relative to the outer portion thereof and this signal which represents a value of the pivotal angle of the crane boom 9 is emitted to the memory 37.

MEANS TO DETERMINE THE PIVOTAL ANGLE OF THE JIB RELATIVE TO THE INNER CRANE BOOM

The potentiometer 24 (FIG. 1) mounted at the articulation point between the jib 13 and the inner crane boom 9 in approximately the same manner as has been described above for the articulation point between the crane boom 9 and the crane post 4.

MEANS TO DETERMINE THE LINEAR MOVEMENT OF THE EXTENSION BOOM RELATIVE TO THE JIB

Figure 8:
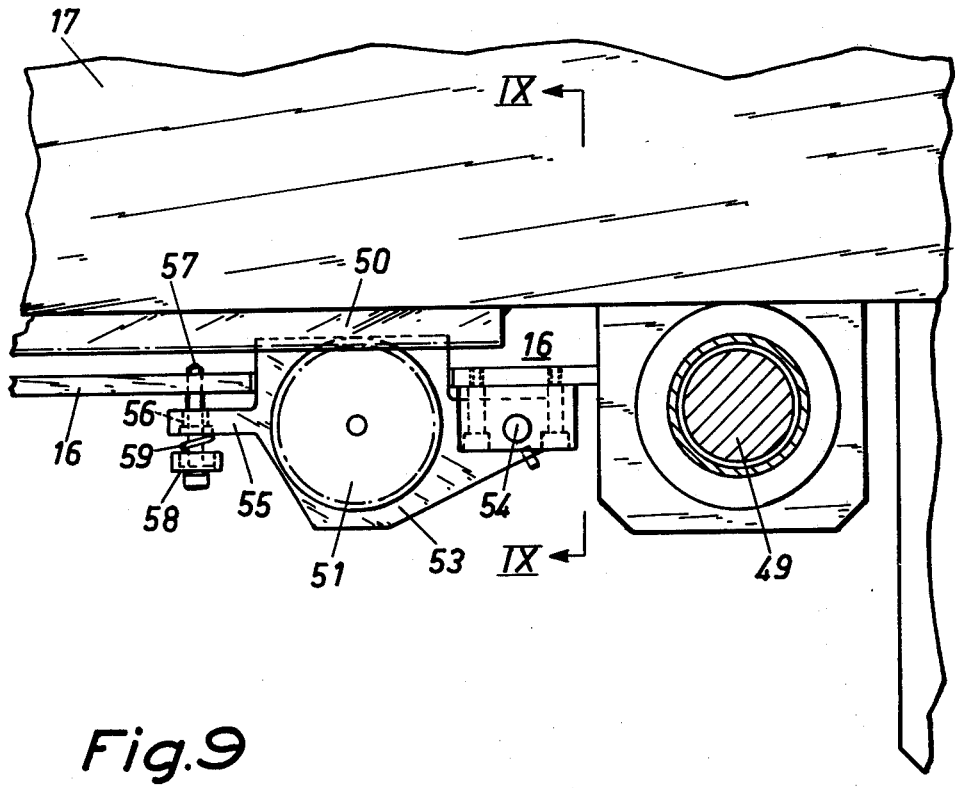
FIG. 8 is a side view which partly in cross-section illustrates a means to emit signals in response to the linear movement of the crane extension boom relative to the jib thereof.
Figure 9:
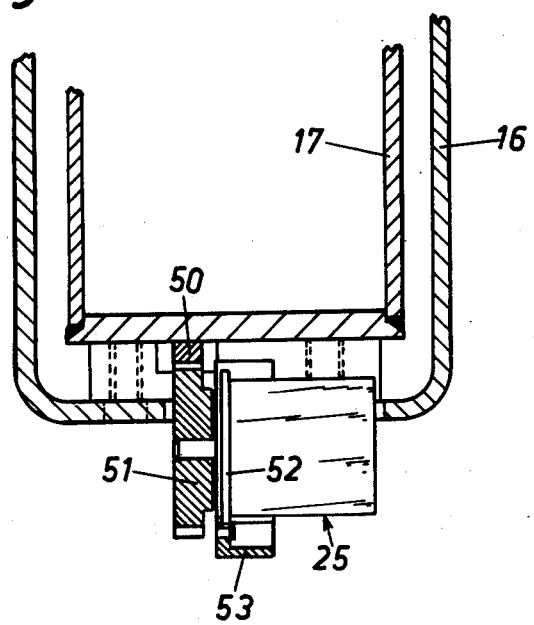
FIG. 9 is a cross-sectional view along the line IX—IXX of FIG. 8.
Figure 10:
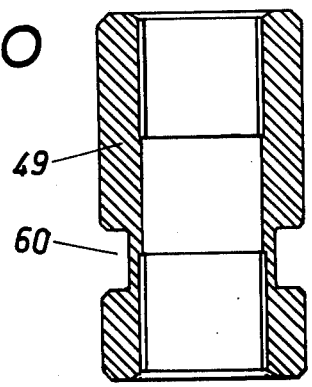
FIG. 10 is a longitudinal sectional view through the support roller of the extension boom.

The boom or extension 17 which is displaceably mounted in the guide means 16 (FIGS. 8 and 9) runs on a support roller 49 and is provided at its lower face with a longitudinally extending rack 50 cooperating with a cog wheel 51 provided at the inner portion of the potentiometer 25. A friction attachment 52 secures the potentiometer 25 to an arm 53 one end of which is journalled to the guide means 16 about a pin 54 and the opposite end 55 of which is provided with an aperture 56 through which passes a bolt 57 attached to the guide means 16. Between arm end 55 and a sleeve 58 secured on the bolt 57 above the bolt head is held a steel spring 59 ensuring that the teeth of the cog wheel 51 constantly are in perfect engagement with the teeth of the rack 50. The support roller 49 of the extension boom 17 is provided with a peripherally extending groove 60 (FIG. 10) which provides clearance to the rack 50 when the extension 17 is displaced outwards (to the right in accordance with FIG. 8).

Upon displacement of the extension boom 17 in the longitudinal direction of the guide means 16 the inner portion of the potentiometer 25 is made to rotate over a number of turns and/or parts of a turn which correspond to the linear movement of the extension. As a result a signal is emitted which corresponds to this displacement and this signal is stored in the memory 37.

MEANS TO DETERMINE THE ROTATIONAL MOVEMENT OF THE ROTATOR

Figure 11:
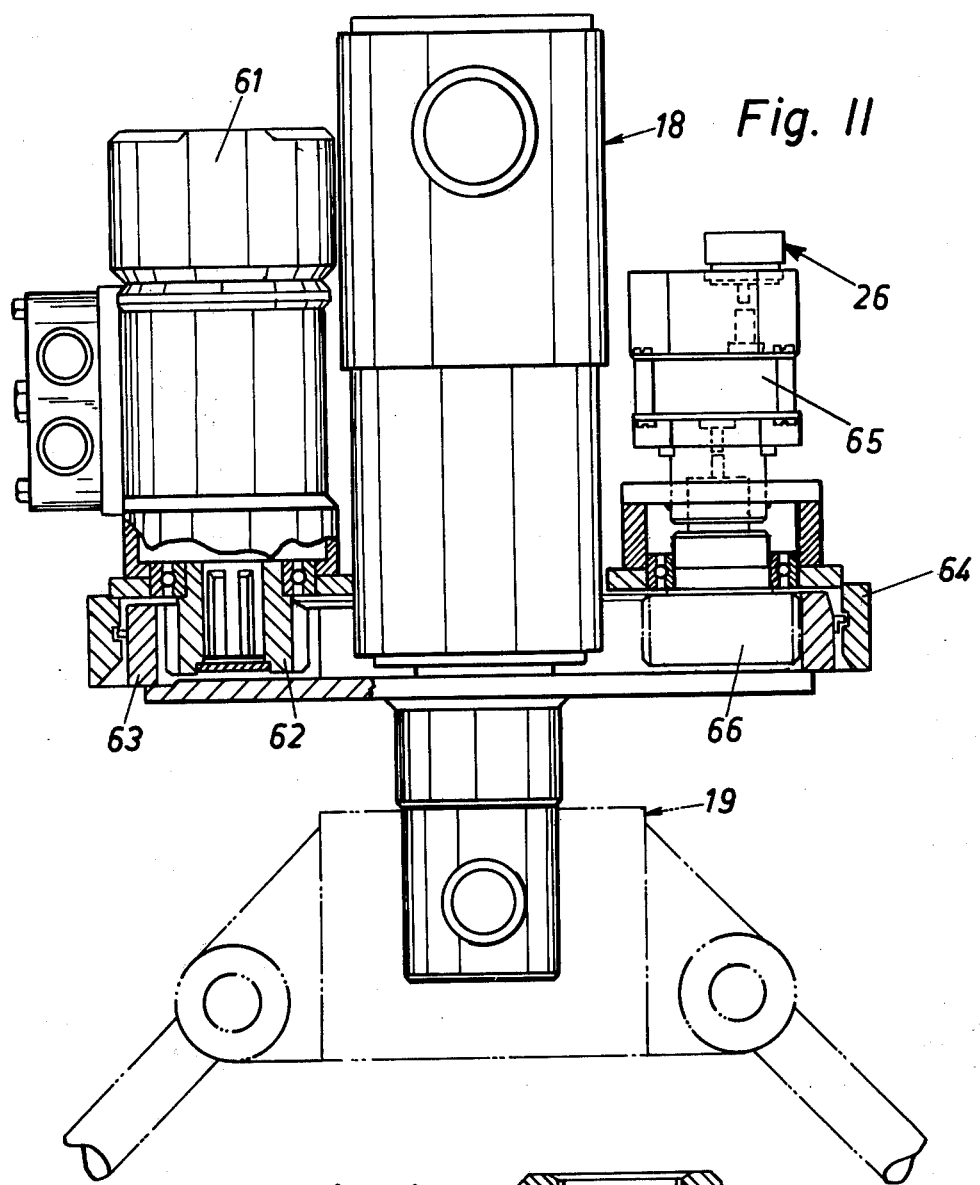
FIG. 11 is a vertical longitudinal sectional view through a rotator with a gripper means thereon, as mounted in the outer end of the extension boom (or in case no such boom is provided, in the outer end of the jib).

The rotator 18 illustrated in FIG. 11 includes a motor 61 on the shaft of which is mounted a cog wheel 62 cooperating with a gear rim 63 which is provided with inner teeth and is rotatably mounted in the stand 64 of the rotator. The stand supports the potentiometer 26 the inner portion of which is turned via a gear box 65 from a cog wheel 66 which is mounted on the input shaft of the gear box and cooperates with the gear rim 63.

Upon turning movement of the gripper 19 by means of the rotator 18 the inner portion of the potentiometer 26 is likewise turned relative to the outer portion thereof over a number of turns and/or parts of a turn corresponding to the rotational angle of the gripper, owing to the transmittance of motion from the gear rim 63 and the cog wheel 66 as well as the gear box 65. As a result a signal is emitted from the potentiometer which corresponds to this rotational angle and the signal is stored in the memory 37.

Figure 2:
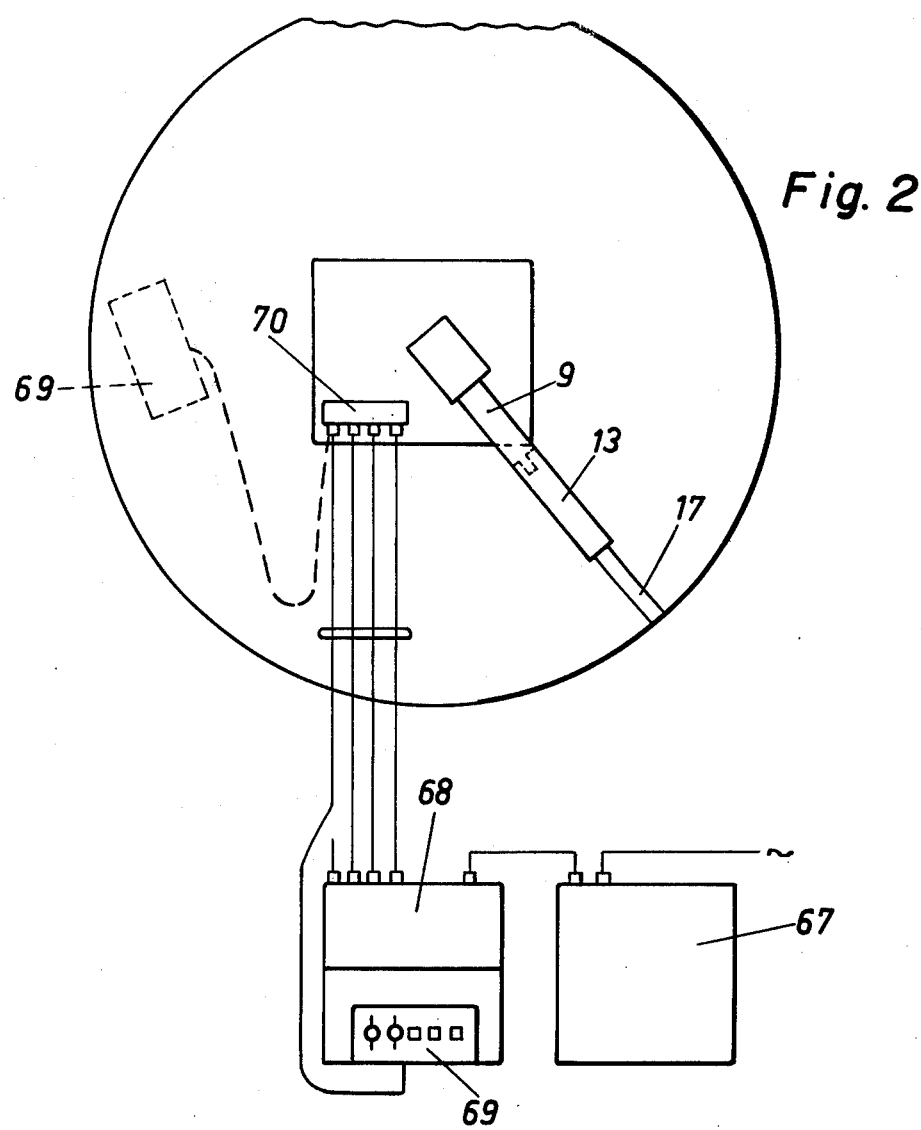
FIG. 2 illustrates schematically a plan view of the loading crane together with its control system.

In FIG. 2 numeral reference 67 designates the pump which is required for the operation of the crane 2, together with the pump motor connected to the network, and numeral reference 68 designates the control unit of the central system. By numeral reference 69 is designated a remote control box which, as indicated in dash-and-dot lines in FIG. 2, may be removably mounted. The control box is by means of conduits connected to a connection box 70 on the crane frame.

In the block diagram shown in FIG. 3 the central logic is designated 71 to which the encoders 22, 23, 24, 25, and 26 are connected. By numeral reference 72 is designated a number of servo amplifiers and by 73 a number of so-called interlocks. Numeral reference 74 designates a power supply unit and 75 a temperature sensor. To the central logic 71 are connected, in addition to the remote control box 69 and the memory 37, also a drive board 76 and an operation board 77.

Figure 4:
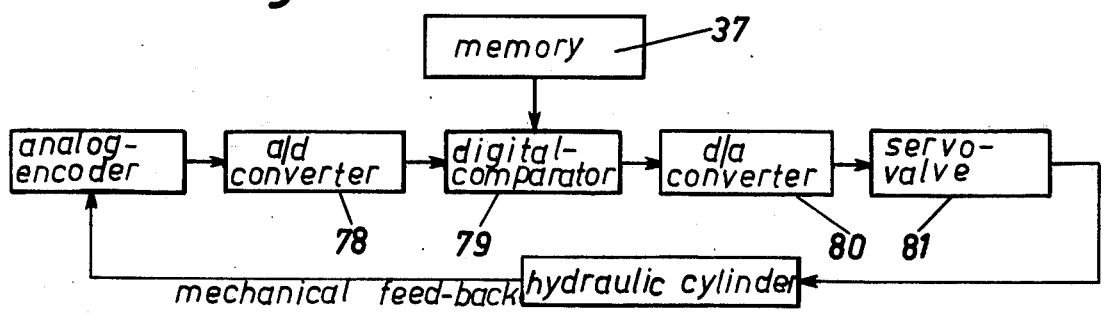
FIG. 4 illustrates a block diagram of the control system intended for only one of the movable parts of the crane.

The signals emitted from the encoders 22 to 26 are of analog type in the form of electric voltage. The turning of the potentiometer in connection with e.g. a swinging movement of the crane boom 9 means a change of the potential of the signal in question. As analog signals are difficult to process this potential signal is converted in the control system into digital signals in a so-called A/D converter, in other words, and analog/digital converter 78 (FIG. 4). Hereby the earlier analog signal is converted into combinations of the digital values 0 to 1. After completion of this conversion operation the now digital signals may be processed in the control system and in a digital comparator 79 be compared with corresponding signals stored in the memory 37 (the tape recorder).

In simple terms, this may be expressed in the following manner. The difference in value of the signal in the (tape recorder) memory 37 and in the potentiometer in question, gives rise to a digital deviation signal which is reconverted via a D/A converter 80, i.e. a digital-/analog converter, from a digital to an analog form, and this analog signal is thereafter used to control (open) the electro-hydraulic directional valve 81, i.e. the valve which controls the pressurized medium to the cylinder provided to bring about the movement in question. These comparison and signal emittance operations are effected at a frequency of approximately 25 times per second. The cylinder continues its operation until the associated potentiometer emits a signal which coincides with the signal from the memory 37.

A general wiring diagram is shown in FIG. 4 to illustrate the function of one of the crane parts, such as the jib 13. The same principles apply to the other crane functions.

The embodiment as shown and described is to be regarded as an example only and the crane structure may be altered in a variety of ways within the scope of the appended claims. The rotator 18 may be replaced by or supplemented with a lifting tool. If no extension boom 17 is provided, the rotator 18 or lifting tool may be secured directly to the outer end of the jib 13.

The means to perform rotation of the potentiometers 22–26 may be constructed differently than as illustrated and described above. The shaft 8 may be rigidly secured to the hoisting boom 9 and movably mounted in the crane post 4. In the latter case, the potentiometer arm 45 is secured to the crane post via the fork 48. Other types of electric encoders than the described potentiometers may be used.

The advantage of the friction attachment 36 lies in the possibility it affords of facilitating adjustment of the various potentiometers during their mounting.

What I claim is:

1. An improved hydraulic loading crane comprising crane parts including a hydraulically rotatable crane post, an inner crane boom mounted at the upper end of said post for hydraulically operated pivotal movement in a vertical plane, a jib mounted at the outer end of said inner boom for hydraulically operated pivotal movement in a vertical plane, said jib provided with means for lifting a load, and an electroncially programmed control system comprising a memory, and a plurality of electrical encoders mounted on said crane and arranged, upon movement of said crane parts from a starting position to an end position and back, to register and store in said memory the change of positions between said crane parts which are movable relative to one another, a servo valve, and a comprising unit inserted between said memory and said servo valve and arranged, upon reading of said memory during the operation of said crane to compare signals stored in said memory with signals which are continuously emitted by said encoders to open said servo valve to values corresponding to the difference between said continuously incoming signals and the signals emitted from said memory for the purpose of feeding a corresponding required quantity of pressurized medium to the various hydraulic means for the purpose of obtaining the pre-programmed movements of said crane parts, said electrical encoders being arranged to register the change of angular positions between any one of said crane parts and said loading crane being further provided with means for turning said crane post comprising a first hydraulically operated rack arranged for reciprocal movement, a cog wheel disposed at the lower end of said post, said first rack cooperating with said cog wheel, said first rack provided with a second rack extending in the longitudinal direction of said first rack, a shaft arranged to drive one of said encoders, and a cog wheel mounted at one end of said shaft, said second rack engaging the teeth of said cog wheel.

2. An improved hydraulic loading crane as claimed in claim 1 wherein said electrical encoders are potentiometers.

3. An improved hydraulic loading crane, comprising crane parts including a hydraulically rotatable crane post, an inner crane boom mounted at the upper end of said post for hydraulically operated pivotal movement in a vertical plane, a jib mounted at the outer end of said inner boom for hydraulically operated pivotal movement in a vertical plane, an extension boom mounted on said jib for displacement in the longitudinal direction of said jib, said extension boom provided an its outer end with means for lifting a load and an electronically programmed control system comprising a memory, and a plurality of electrical encoders mounted on said crane and arranged, upon movement of said crane parts from a starting position to an end position and back, to register and store in said memory the change of positions between said crane parts which are movable relative to one another, a servo valve, and a comparing unit inserted between said memory and said servo valve and arranged, upon reading of said memory during the operation of said crane to compare signals stored in said memory with signals which are continuously emitted by said encoders to open said servo valve to values corresponding to the difference between said continuously incoming signals and the signals emitted from said memory for the purpose of feeding a corresponding, required quantity of pressurized medium to the various hydraulic means, for the purpose of obtaining the pre-programmed movements of said crane parts, said electrical encoders being arranged to register the change of angular positions between any one of said crane parts and wherein a rotator is mounted at the outer end of said extension boom, said lifting means being supported by said rotator, said rotator having a motor driven gear rim provided thereon, a shaft supported on said rotator, a cog wheel mounted on said shaft, said gear rim cooperating with said cog wheel, said shaft being operatively connected to one of said encoders.

4. An improved hydraulic loading crane as claimed in claim 3 wherein said encoders are potentiometers.

* * * * *